United States Patent [19]
Byers

[11] Patent Number: 5,986,802
[45] Date of Patent: *Nov. 16, 1999

[54] FOLDABLE BINOCULAR ASSEMBLY

[76] Inventor: Thomas L. Byers, 5480 Stewart Dr., Mustang, Okla. 73064

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,465

[22] Filed: Aug. 18, 1997

[51] Int. Cl.$^6$ .............................. G02B 27/02; G02B 27/22
[52] U.S. Cl. ............................................. 359/408; 359/480
[58] Field of Search .................................. 359/407–409, 359/480–482, 808–812, 816–819, 827, 474

[56] References Cited

U.S. PATENT DOCUMENTS

| | | | |
|---|---|---|---|
| 2,768,554 | 10/1956 | Leslie | 359/474 |
| 4,013,341 | 3/1977 | Riley | 359/408 |
| 4,239,328 | 12/1980 | Justice, Sr. et al. | 359/408 |
| 4,268,111 | 5/1981 | Green et al. | 359/408 |
| 4,443,071 | 4/1984 | Ueda | 359/408 |
| 4,478,498 | 10/1984 | Ohno | 359/408 |
| 4,486,079 | 12/1984 | Ueda | 359/408 |
| 4,773,747 | 9/1988 | Bresnahan | 359/408 |
| 4,964,709 | 10/1990 | Hoeptner | 359/480 |
| 5,552,932 | 9/1996 | Schultz | 359/408 |

*Primary Examiner*—Thong Nguyen
*Attorney, Agent, or Firm*—McAfee & Taft

[57] ABSTRACT

A collapsible binocular foldable between an open operable position and a closed position made of a semirigid material. The foldable binocular includes an objective lens panel, an ocular lens panel and top and bottom panels hingedly connected to the objective and ocular lens panels. A lateral flap is attached to and extends outward from the lateral edges of the front panel. The objective, ocular and top and bottom panels define the side opening which is generally trapezoidally shaped in the open position. The lateral flaps include a middle portion which is likewise generally trapezoidally shaped and which covers the side openings when the binocular is in the open position. The lateral flap has a length which is greater than a length of the side openings so that when the lateral flap is closed to cover the side openings, the flap will engage the ocular lens panel to prevent overinsertion.

17 Claims, 4 Drawing Sheets

FOLDABLE BINOCULAR ASSEMBLY

BACKGROUND OF THE INVENTION

This invention relates to a foldable binocular assembly, and more particularly to a binocular assembly that is foldable from an open, operable position to a folded, collapsed position in which the foldable binocular is relatively flat. Several binoculars of the foldable type are known in the prior art. Such binoculars are made of a relatively thin, semirigid material such as cardboard. Binoculars of this type are shown in U.S. Pat. No. 4,013,341 to Riley, U.S. Pat. No. 4,268,111 to Green et al., U.S. Pat. No. 4,478,498 to Ohno, U.S. Pat. No. 4,773,747 to Bresnahan, U.S. Pat. No. 4,239,328 to Justice, Sr., et al., and U.S. Pat. Nos. 4,443,071 and 4,486,079 to Ueda. Although numerous foldable binoculars are known, there is a need for a foldable binocular which can be easily folded into a compact shape, and which at the same time has a support means to adequately support and hold the binocular in the open, operable position so that the proper distance between the objective and ocular lenses is maintained. Finally, it is desirable that the lenses be protected when the binocular is in the collapsed position.

SUMMARY OF THE INVENTION

The present invention relates to a foldable binocular which is movable, or foldable between an operable, open position and a folded, closed position, also referred to as a collapsed position. The foldable binocular may be made from a semi-rigid, relatively thin material such as cardboard. The foldable binocular of the present invention includes an objective lens panel with a pair of spaced openings defined therein for locating a pair of objective lenses, and an ocular lens panel with a pair of spaced openings defined therein for locating a pair of ocular lenses.

The binocular includes a top panel hingedly connected to the objective and ocular lens panels and a bottom panel likewise hingedly connected to the objective and ocular lens panels. The top panel includes a visor portion which extends forward from the objective lens panel to shade the objective lens panel when the binocular is in the open, operable position. When the binocular is in the closed position, the visor acts as a cover for the objective lenses. The objective and ocular lens panels and top and bottom panels define a pair of opposed side openings. A lateral flap is hingedly connected to and extends outwardly from the lateral edges at each end of the objective lens panels. The lateral flaps include a middle portion, wherein the middle portion is hingedly connected to the objective lens panel. The middle portion thus has a first end connected to the objective lens panel and also has a second end, which is a free end. The middle portion has two side edges extending between its first and second ends. A tab is hingedly connected to and extends from each side edge of the middle portion. The tabs are insertable into the side openings.

The middle portion of at each lateral flap may have a length greater than the length of the side openings so that an inner surface of the middle portion will engage the lateral edges of the ocular lens panel to insure that the tabs are inserted far enough into the side opening, and to also prevent the lateral flaps from being inserted too far into the side opening. The lateral flaps comprise support means which support the upper and lower panels and which rigidities the binocular when it is in an open, operable position and prevents the binocular from being collapsed while in the open position. The lateral flaps also comprise a fixing means which fixes and maintains a proper distance between the objective and ocular lens panels when the binocular is in the open position. The lateral flaps act as a cover for the ocular lenses to prevent scratching or other damage from occurring, when the binocular is folded flat.

Thus, it is an object of the invention to provide a binocular that is foldable into a generally rectangularly shape that is compact and substantially flat, and that is sufficiently rigid in the open position so that a proper distance between the objective and ocular lenses is maintained thereby maintaining a proper operable shape, and to provide a protective cover for the lenses when the binocular is in the closed position.

DETAILED DESCRIPTION OF A PREFERRED EMBODIMENT

Figure 1:
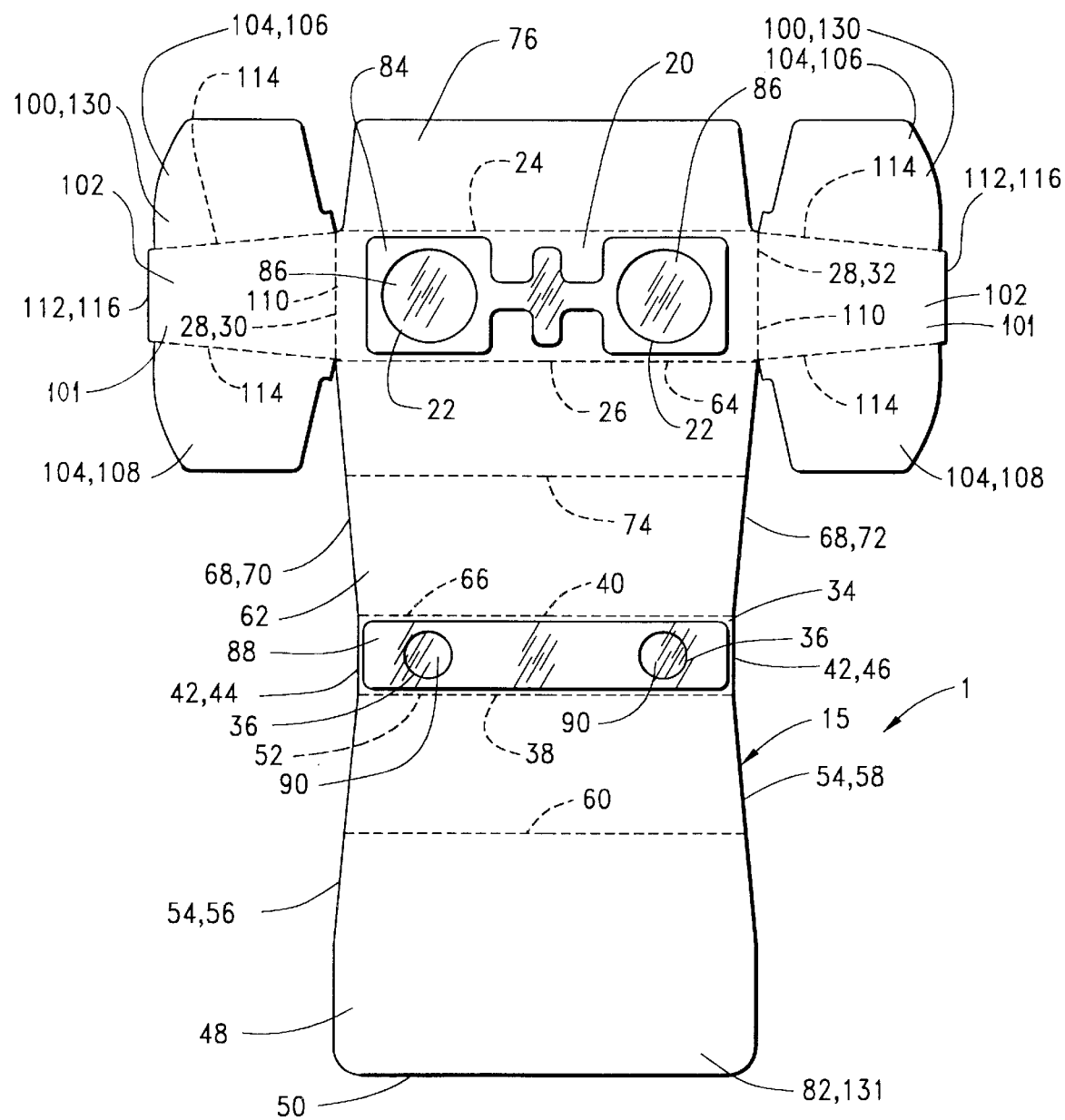
FIG. 1 is a plan view of a foldable binocular with the binocular expanded for better illustration.
Figure 2:
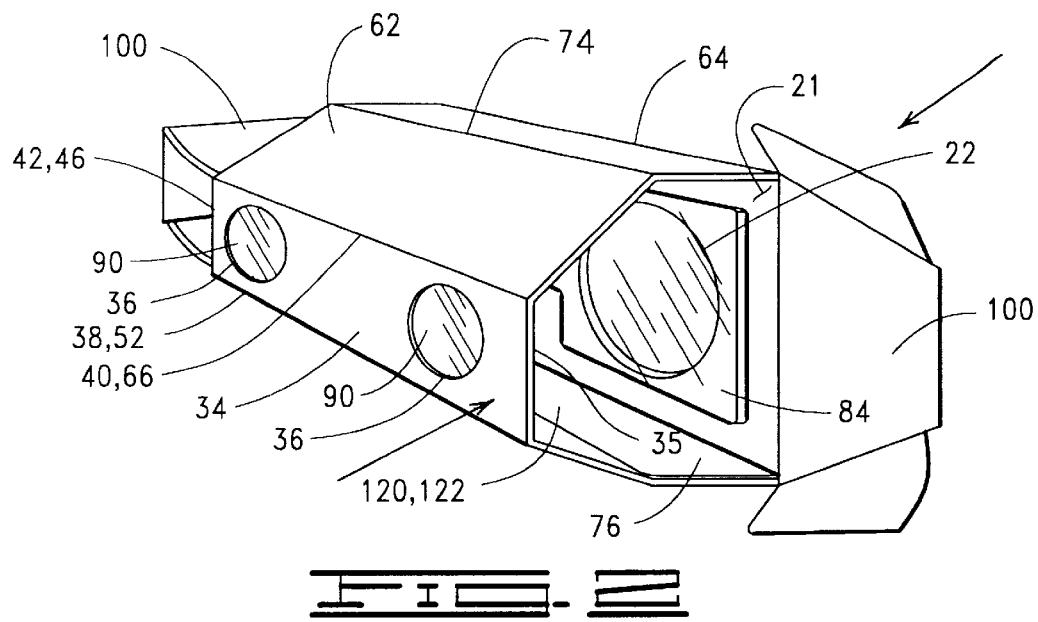
FIG. 2 is a perspective view showing the foldable binocular partially open.
Figure 3:
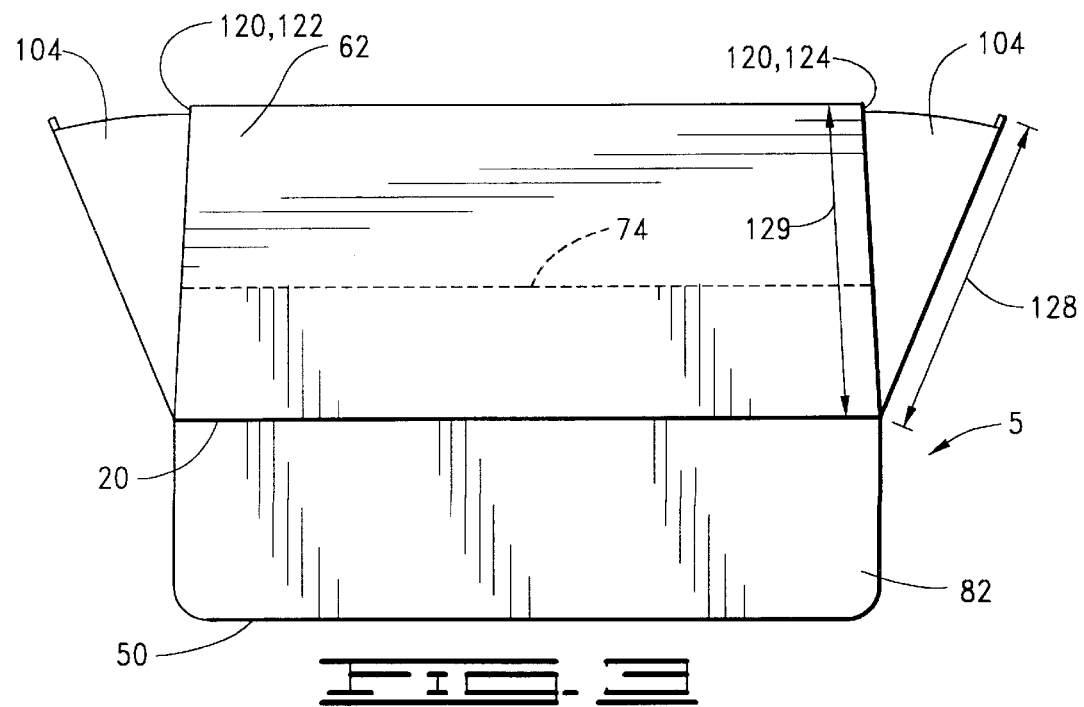
FIG. 3 is a bottom elevation view of the foldable binocular in the operable position with the flaps partially inserted.
Figure 4:
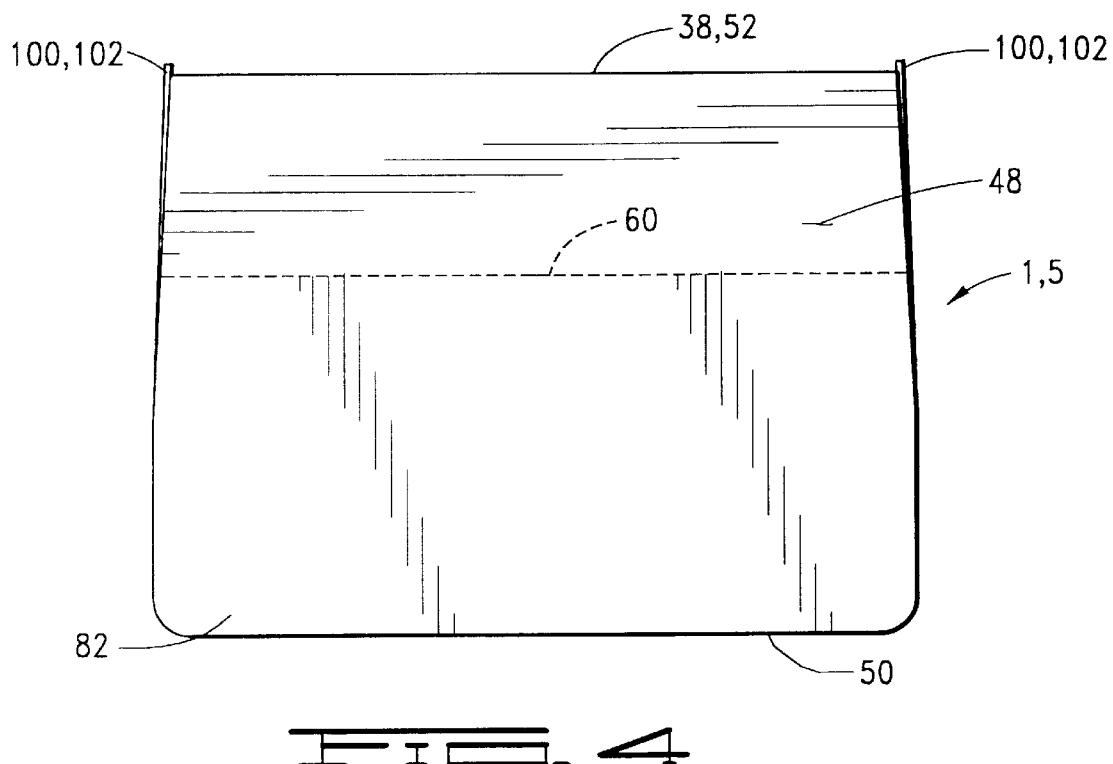
FIG. 4 is a top elevation view of the binocular in the operable position.
Figure 5:
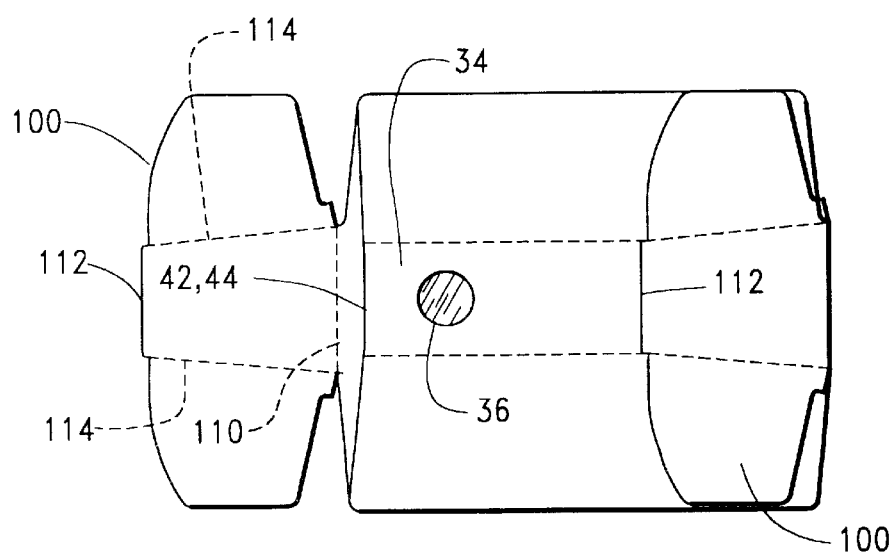
FIG. 5 is a plan view of the binocular in the closed position, with one lateral flap covering an ocular lens.
Figure 6:
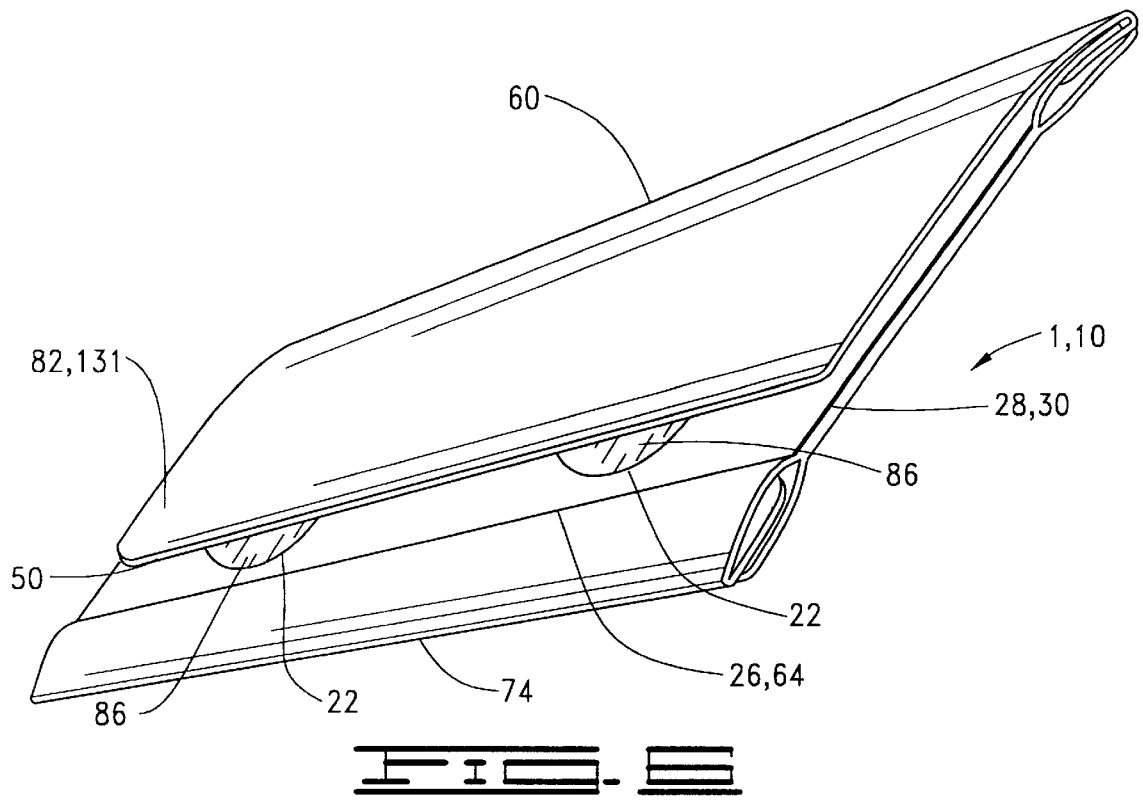
FIG. 6 is a perspective view of the binocular in the closed position.
Figure 7:
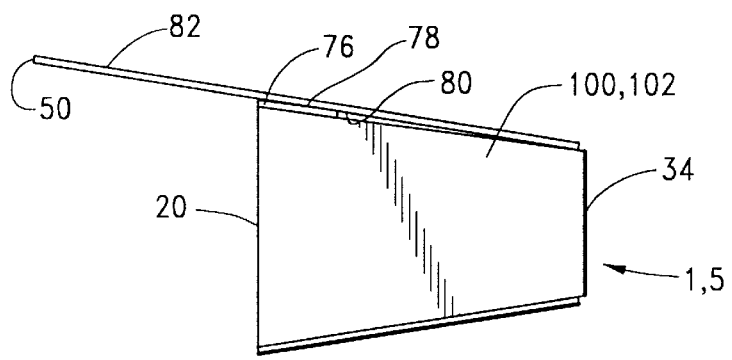
FIG. 7 is a side view of the binocular in the open, operable position.

Referring now to the drawings and more particularly to FIGS. 1 and 2, a foldable, or collapsible binocular 1 is shown. The binocular is foldable or movable between an open, or operable position 5 as shown in FIGS. 3, 4 and 7, and a closed, or collapsed position 10 as shown in FIG. 6. As shown in FIG. 6, the binocular in its closed position is substantially flat and is generally rectangularly shaped. The foldable binocular includes a binocular blank 15 having a front, or objective lens panel 20 with a pair of spaced openings 22 defined therein for locating a pair of objective lenses. Front panel 20 includes an inner surface 21, an upper edge 24, a lower edge 26 and a pair of opposed lateral edges 28 including a first lateral edge 30 and a second lateral edge 32. Binocular 1 further includes an ocular, or rear lens panel 34 having a pair of spaced openings 36 defined therethrough for locating a pair of ocular lenses. Rear lens panel 34 has an inner surface 35, an upper edge 38, a lower edge 40 and a pair of opposed lateral edges 42 including a first lateral edge 44 and a second lateral edge 46. The binocular also includes an upper or top panel 48 hingedly connected to front and rear panels 20 and 34, respectively. Upper panel 48 includes a forward edge 50, a rear edge 52 and a pair of opposed lateral edges 54 including a first lateral edge 56 and a second lateral edge 58. Upper panel 48 includes an upper fold line 60 which is preferably substantially parallel to forward and rear edges 50 and 52, respectively.

Binocular 1 further includes a lower or bottom panel 62 having a forward edge 64, a rear edge 66 and a pair of opposed lateral edges 68 which includes a first lateral edge 70 and a second lateral edge 72. Lower panel 62 includes a lower fold line 74 which is preferably parallel to forward and rear edges 64 and 66, respectively.

Rear edge 52 of upper panel 48 is substantially collinear with upper edge 38 of rear panel 34 so that the hinged connection between the rear and upper panels is at edges 38 and 52. Likewise, rear edge 66 of lower panel 62 is substantially collinear with lower edge 40 of rear panel 34 so that the hinged connection between the lower panel and the rear panel is at edges 40 and 66. Forward edge 64 of lower panel 62 is substantially collinear with lower edge 26 of front panel 20 so that the hinged connection between the lower panel and the front panel is at edges 26 and 64.

Binocular 1 further includes a mounting flap 76 hingedly connected to upper edge 24 of front panel 20. Mounting flap 76 has an upper surface 78 which is bonded to or otherwise connected to a lower surface 80 of upper panel 48 thus hingedly connecting upper panel 48 to front panel 20 at the upper edge 24 thereof. Mounting flap 76 extends rearward from upper edge 24 when the binocular is in its open operable position, as shown in FIG. 7. Top panel 48 extends outwardly in a forward direction from front panel 20 to its forward edge 50. That portion of the upper panel that extends forward from front panel 20 may be referred to as a visor or visor portion 82 which, as will be explained more fully herein protects and shades the objective lenses when the binocular is in the operable position. The binocular further includes an objective lens plate 84 attached to inner surface 21 of front panel 20. The objective lens plate includes a pair of objective lenses 86 positioned over spaced openings 22. An ocular lens plate 88 is attached to inner surface 35 of rear panel 34. Ocular lens plate 88 includes a pair of ocular lenses 90 positioned over spaced openings 36 in rear panel 34.

Binocular 1 further includes a pair of lateral flaps 100 hingedly connected to and extending outwardly from lateral edges 28 of front panel 20. Each lateral flap has an inner surface 101 and comprises a middle portion 102 with a pair of side tabs 104 extending therefrom including an upper side tab 106 and a lower side tab 108. Middle portion 102 has a first end 110 which is connected to a lateral edge 28 and which is substantially collinear therewith so that lateral flaps 100 and front panel 20 are hingedly connected at first ends 110 thereof to lateral edges 28 of front panel 20. Middle portion 102 extends outward from first end 110 of lateral flaps 100 to a second or free end 112. Middle portions 102 include side edges 114 which extend between first and second ends 110 and 112, respectively. Side tabs 104 are hingedly connected to middle portion 102 at side edges 114 thereof. Middle portion 102 extends outward from front panel 20 farther than side tabs 104 so that middle portion 102 defines a lip 116.

Referring now to FIG. 3, side openings 120, which include a first side opening 122 and second side opening 124, are defined by outer lateral edges 28, 42, 54 and 68 of the front, rear, upper and lower panels 20, 34, 48 and 62, respectively. As seen in FIGS. 2 and 3, because the side tabs 104 are hingedly connected to middle portion 102, the side tabs may be folded with respect thereto and are insertable into side openings 120. Side openings 120 have a length 129 which is shorter than a length 128 of lateral flaps 100, which is defined on middle portion 102. Thus, when tabs 104 are inserted into side openings 120, inner surface 101 on middle portion 102 of lateral flaps 100 will engage outer, lateral edges 44 and 46 of rear panel 34 to prevent the lateral flaps from being inserted too far into the side opening.

As can be seen in FIG. 7, when the binocular is in its operable position 5, side openings 120 are generally trapezoidally shaped. Likewise, middle portion 102 is preferably generally trapezoidally shaped and thus matches the shape of, and covers side openings 120. The lateral flaps 100 when inserted the proper distance as shown in FIG. 4, rigidify the binocular and thus maintain the binocular in its proper position so that the proper length, or distance 129 between the objective lens and the ocular lens is maintained. Lateral flaps 100 may therefore be referred to as a support or rigidifying means 130.

To fold the binocular from its open, operable position 5 to its closed position 10, the lateral flaps 100 are completely retracted from side openings 120. Pressure is then applied in a direction normal or perpendicular to the front and rear panels as depicted by the arrows shown in FIG. 2. Upper and lower panels 48 and 62 will fold about upper fold lines 60 and 74, respectively. As the front and rear panels are moved towards one another, front and rear panels 20 and 34 will hinge about their upper and lower edges until the front and rear panels are adjacent one another in a substantially flat condition as shown in FIG. 6. Visor portion 82 may be referred to as a protective means 131 since visor portion 82 covers objective lenses 86 to prevent scratching and other damage when the binocular is in the folded position. Likewise, lateral flaps 100 may comprise a portion of the protective means 131 since in the closed position lateral flaps 100 are folded over and completely cover ocular lenses 90 to prevent scratching and other damage from occurring when the binocular is in folded or closed position 10.

Foldable binocular 1 as described provides numerous advantages over prior art foldable binoculars. For example, mounting flap 76 is folded rearwardly from front panel 20 and affixed to upper panel 58. Such a fold is consistent with standard box-type construction and thus renders the foldable binocular more readily makeable than other foldable binoculars such as those shown in U.S. Pat. Nos. 4,773,747, 4,486,079 and 4,443,071, all of which show a flap folded to extend forward from the front panel. In addition the lateral flaps support the upper and lower panels and act as fixing means which fix and maintain the proper distance between the lens panels. The lateral flaps also rigidify the binocular and support the upper and lower panels.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments as followed in the true scope of this invention.

What is claimed is:

1. A foldable binocular, comprising:
   an objective lens panel having a pair of spaced openings defined therein for locating a pair of objective lenses and having first and second opposed lateral edges;
   a pair of objective lenses positioned over said spaced openings on said objective lens panel and attached thereto;
   an ocular lens panel having a pair of spaced openings defined therein for locating a pair of ocular lenses and having first and second opposed lateral edges;
   a pair of ocular lenses positioned over said spaced openings in said ocular lens panel and attached thereto;
   a top panel hingedly connected to said ocular lens panels, said top panel having a fold line defined thereon;
   a bottom panel hingedly connected to said objective and ocular lens panels, said bottom panel having a fold line defined thereon, said lens panels and said top and bottom panels defining a pair of side openings;
   a lateral flap hingedly connected to and extending outwardly from each lateral edge of said objective lens panel, each said lateral flap comprising:

a non-foldable middle portion having a first end, a second end and two side edges extending therebetween, said first end being hingedly connected to one of said lateral edges of said objective lens panel; and a tab hingedly connected to and extending from each side edge of said middle portion of said lateral flaps, said binocular being foldable between an open, operable position and a closed, substantially flat position, said tabs being insertable into said side openings when said binocular is in said open, operable position, said binocular being foldable into said substantially flat position by applying pressure in a direction normal to said objective and said ocular lens panels when said tabs are fully retracted from said side openings.

2. The binocular of claim 1, wherein said lateral flaps cover said ocular lenses when said binocular is in said closed position.

3. The binocular of claim 1, wherein said middle portion of said lateral flaps engage said lateral edges of said ocular lens panel when said tabs are inserted into said side openings, thereby preventing overinsertion.

4. The binocular of claim 1, said tabs comprising support means for supporting said top and bottom panels when said binocular is in said open, operable position.

5. The binocular of claim 1 further comprising a mounting flap hingedly connected to an upper edge of said objective lens panel, said mounting flap being affixed to said top panel.

6. The binocular of claim 1, wherein said top panel defines a visor, said visor extending outward from an upper edge of said objective lens panel.

7. A collapsible binocular comprising:

a front panel having a pair of openings defined therein for locating a pair of objective lenses, said front panel having a top edge, a bottom edge, and opposed lateral edges;

a rear panel having a pair of openings defined therein for locating a pair of ocular lenses, said rear panel having a top edge, a bottom edge, and opposed lateral edges;

a top panel having a forward edge, a rear edge and opposed lateral edges, said top panel being hingedly connected to said rear panel;

a bottom panel having a forward edge, a rear edge and opposed lateral edges, said bottom panel being hingedly connected to said front and rear panels, said binocular being collapsible from an open, operable position to a collapsed position, wherein said opposed lateral edges of said front, rear, top and bottom panels define a pair of side openings having a generally trapezoidal shape when said binocular is in said open, operable position;

a lateral flap hingedly attached to and extending outward from each lateral edge of said front panel, said lateral flaps being selectively insertable in and retractable from said side openings, and having a length greater than a length of said side openings, wherein said lateral flaps will engage said lateral edges of said rear panel to prevent overinsertion into said side opening and will cover said side openings when said binocular is in said operable position, and wherein said lateral flaps prevent said binocular from collapsing to said closed position when said lateral flaps are inserted into said side openings.

8. The binocular of claim 7, said lateral flaps comprising:

a generally trapezoidal-shaped non-foldable middle portion, said middle portion substantially covering said side openings and engaging said lateral edges of said rear panel when said binocular is in said open, operable position, said middle portion being hingedly connected to said lateral edge of said front panel; and a pair of tabs hingedly connected to said middle portion, said tabs having a length less than said length of said middle portion and being insertable into side openings.

9. The binocular of claim 8 wherein said tabs comprise upper tabs and lower tabs, said lower tabs being positioned adjacent said bottom panel and said upper tabs being positioned adjacent said top panel when said binocular is in said operable position.

10. The binocular of claim 8, wherein said tabs comprise support means for supporting said top and bottom panels when said binocular is in said operable position.

11. The binocular of claim 7 comprising a visor extending forward of said top edge of said front panel, said visor comprising a portion of said top panel.

12. The binocular of claim 7, further comprising a mounting flap hingedly connected to said top edge of said front panel, said mounting flap being connected to said top panel thereby hingedly connecting said front panel to said top panel.

13. A foldable collapsible binocular comprising:

an objective lens panel, said objective lens panel having a pair of spaced openings defined therein;

an ocular lens panel having a pair of spaced openings defined therein;

a top panel connected to said objective and ocular lens panels;

a bottom panel connected to said objective and ocular lens panels, said objective lens, top, bottom and ocular lens panels defining a pair of side openings, said binocular being collapsible from an open to a closed position, said objective and ocular lens panels having a distance therebetween defining a length of said side opening in said open position; and a pair of opposed lateral flaps attached to and extending from opposed lateral edges of said objective lens panel, said flaps being insertable into said side openings and having a length greater than said length of said side openings, wherein an inner surface of said flaps engage lateral edges of said ocular lens panel to prevent overinsertion in said side openings, and wherein said lateral flaps rigidify said binocular to prevent said binocular from moving from said open to said closed position when said lateral flaps are inserted in said side openings.

14. The binocular of claim 13 wherein said top panel defines a visor extending forward from said objective panel when said binocular is in said open position.

15. The binocular of claim 13 wherein:

said lateral flaps comprise a means for supporting said top and bottom panels.

16. The binocular of claim 13 wherein said lateral flaps comprise means for maintaining said distance between said objective and ocular lens panels.

17. The binocular of claim 13 wherein said flaps cover said openings in said ocular lens panel when said binocular is in said closed position.

* * * * *